United States Patent
Gärdenfors

(10) Patent No.: US 9,207,840 B2
(45) Date of Patent: Dec. 8, 2015

(54) METHOD AND APPARATUS FOR MODIFYING A SCROLLBAR HANDLE ACCORDING TO CHARACTERISTICS OF DISPLAYED ITEMS BEING SCROLLED

(75) Inventor: Dan Zacharias Gärdenfors, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 581 days.

(21) Appl. No.: 13/543,534

(22) Filed: Jul. 6, 2012

(65) Prior Publication Data

US 2014/0009490 A1    Jan. 9, 2014

(51) Int. Cl.
| | | |
|---|---|---|
| G06F 3/00 | (2006.01) | |
| G06F 3/0484 | (2013.01) | |
| G06F 3/0485 | (2013.01) | |

(52) U.S. Cl.
CPC .......... *G06F 3/0484* (2013.01); *G06F 3/04855* (2013.01)

(58) Field of Classification Search
CPC   G06F 3/04847; G06F 3/04855; G06F 3/0485
USPC ............................................ 345/619; 715/786
See application file for complete search history.

(56) References Cited

U.S. PATENT DOCUMENTS

| 5,532,715 A | * | 7/1996 | Bates et al. | .................... | 345/684 |
| 8,887,085 B1 | * | 11/2014 | Cox et al. | ...................... | 715/786 |
| 2005/0091596 A1 | * | 4/2005 | Anthony et al. | ............... | 715/712 |
| 2006/0036960 A1 | * | 2/2006 | Loui | .............................. | 715/764 |
| 2009/0070707 A1 | * | 3/2009 | Schaller et al. | ................ | 715/787 |
| 2010/0174993 A1 | * | 7/2010 | Pennington et al. | .......... | 715/738 |
| 2010/0306704 A1 | * | 12/2010 | Cotterill | ........................ | 715/833 |

OTHER PUBLICATIONS

European Patent Office, "Communication pursuant to Article 94(3) EPC," issued in connection with application No. EP 12175430.3, on Feb. 19, 2014, 6 pages.

Chimera, Richard, "Value Bars: An Information Visualization and Navigation Tool for Multi-attribute Listings," CHI '92 Proceedings of the SIGCHI Conference on Human Factors in Computing Systems, May 3-7, 1992, 4 pages. Cited in "Communication pursuant to Article 94(3) EPC," issued in connection with application No. EP 12175430.3, on Feb. 19, 2014.

Masui, Toshiyuki, "LensBar—Visualization for Browsing and Filtering Large Lists of Data," INFOVIS '98 Proceedings of the 1998 IEEE Symposium on Information Visualization, Oct. 19-20, 1998, 10 pages. Cited in "Communication pursuant to Article 94(3) EPC," issued in connection with application No. EP 12175430.3, on Feb. 19, 2014.

(Continued)

*Primary Examiner* — Michelle Sams
(74) *Attorney, Agent, or Firm* — Fish & Richardson P.C.

(57) ABSTRACT

A method of navigating content items presented in a graphical user interface of an electronic device is provided. The content items of a content item list are displayed on the electronic device with a navigation list associated with a characteristic defined in each of the content items. The content list is sorted by the characteristics, for example by time, alphabetically or numerically. A navigation element in the navigation list is modified based upon the measure of the displayed content items within the content item list providing a sense of measure relative to the overall navigation list.

29 Claims, 12 Drawing Sheets

(56) References Cited

OTHER PUBLICATIONS

McCrickard et al., "Beyond the Scrollbar: An Evolution and Evaluation of Alternative Navigation Techniques," VL '99 Proceedings of the IEEE Symposium on Visual Languages, Sep. 13-16, 1999, 10 pages. Cited in "Communication pursuant to Article 94(3) EPC," issued in connection with application No. EP 12175430.3, on Feb. 19, 2014.

Office Action issued in Canadian Application No. 2,820,280 on Sep. 15, 2015; 4 pages.

* cited by examiner

METHOD AND APPARATUS FOR MODIFYING A SCROLLBAR HANDLE ACCORDING TO CHARACTERISTICS OF DISPLAYED ITEMS BEING SCROLLED

TECHNICAL FIELD

The present disclosure relates to graphical user interfaces and in particular to the display of content items in a list in a graphical user interface of an electronic device.

BACKGROUND

Content items such as notes, blog postings, calendar entries, images and social network updates, may be presented as a list in a graphical format in a graphical user interface to enable ease of navigation through the list. The content item may be presented as a list sorted chronologically, alphabetically, or numerically based upon a characteristic associated with each of content items, such as time, date, name, rank, order, etc. However, if the characteristic used to sort the content items are not distributed at regular intervals, navigation through the content item list may provide an unsatisfactory user experience.

Therefore there is a need for an improved system and method for displaying content items.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
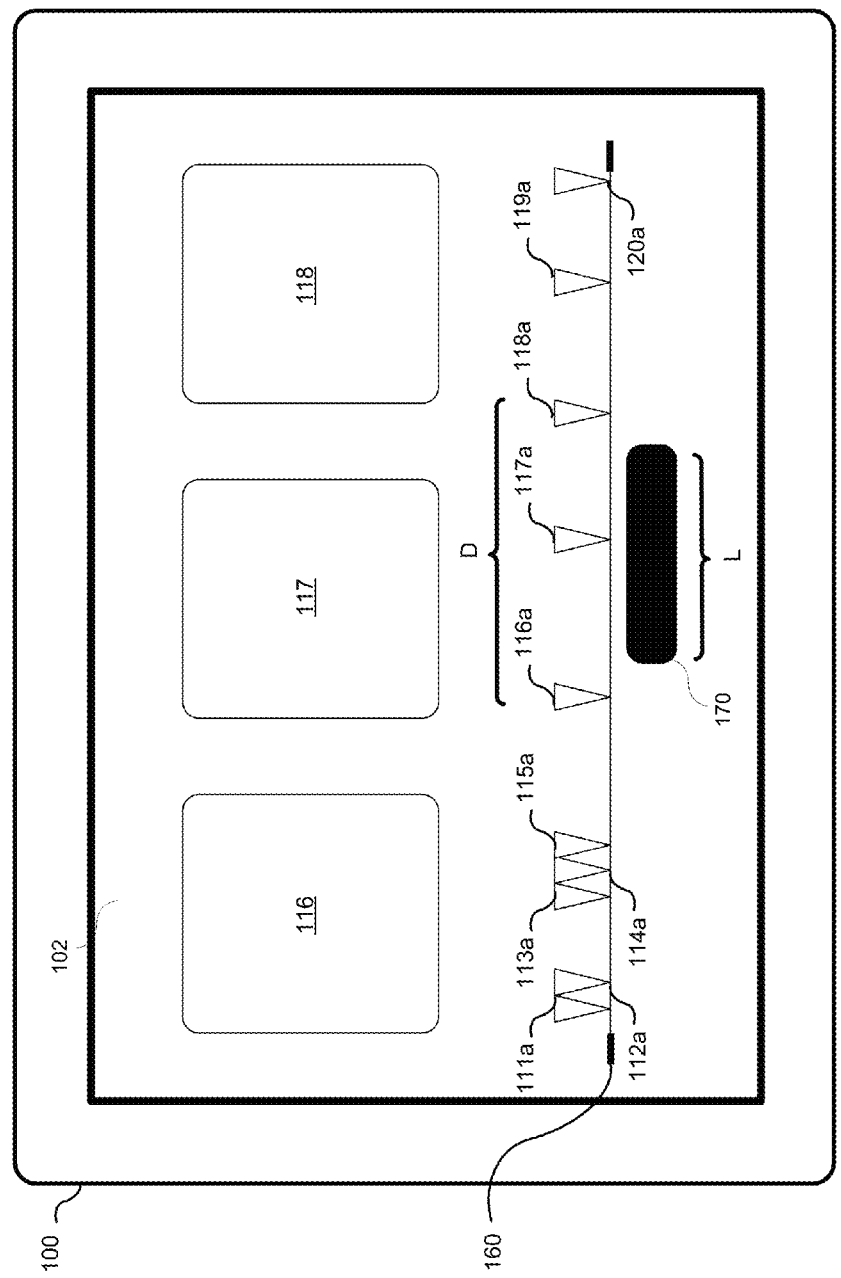
FIGS. 1 to 4 show representations of a graphical user interface displaying content items.

In accordance with an aspect of the present disclosure there is provided a method on an electronic device, the method comprising: displaying content items each having an associated common property; and displaying an indicia in association with the displayed content items, the indicia having a display element corresponding at least in part to a distribution of a measure of the common property associated with the content items.

In accordance with another aspect of the present disclosure there is provided an electronic device for navigating a plurality of content items in a graphical user interface, the electronic device comprising: a touch-sensitive display for presenting the graphical user interface; a processor coupled to the touch-sensitive display; and a memory containing instructions for execution by the processor, the instructions comprising: displaying content items each having an associated common property; and displaying an indicia in association with the displayed content items, the indicia having a display element corresponding at least in part to a distribution of a measure of the common property associated with the content items.

In accordance with yet another aspect of the present disclosure there is provided a computer readable memory containing instructions for navigating a plurality of content item in a graphical user interface, the instructions when executed a processor perform: displaying content items each having an associated common property; and displaying an indicia in association with the displayed content items, the indicia having a display element corresponding at least in part to a distribution of a measure of the common property associated with the content items.

Embodiments are described below, by way of example only, with reference to FIGS. 1 to 12. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Content items that are created or posted such as notes, articles, e-mail, contacts, image files, video files, audio files, text messaging, blog postings, diary entries, bookmarks, location or position information, and social network updates, or any combination therein, may be sorted chronologically, alphabetically, or numerically to facilitate navigation based upon an associated properties or characteristics. The associated properties may be presented to facilitate orientation or navigation through the content items with in the content item list, for example by presentation of a navigation list with an indicia or navigation element to show a position relative to the associated property. Movement of a navigation element through the navigation list may be tied to the movement of the content items visible within the display. The navigation element provides an indication of the position of the content items currently displayed relative to the common property of the content items. Identifiers or bookmarks associated with the common properties of each content item can provide an index along the navigation list based upon the properties or characteristics associated with or derived from the content items. The identifiers can be utilized to show relative position of content items within the sorted navigation list such as for example chronologically, alphabetically, or numerically. If the navigation list contains a lot of empty space between characteristics, for example content items are sorted by time and the time intervals between the content items are irregular in that there are periods when no content was generated/saved, when content items are moved in the graphical user interface a uniform navigation element will vary in speed along the navigation list and not provide a sense of span relative to the navigation list of the displayed content items within the content item list.

FIG. 1 shows a representation of a graphical user interface providing content items displayed relative to a property common to the content items. The graphical user interface 102 is presented by an electronic device 100 for displaying or navigating in a graphical format the list of the content items 111-120. The content items are displayed relative to a property or characteristic common 111a-120a to each of the content items 111-120 which can be used to sort the content items 111-120, for example by one or more characteristics such as time, date, distance, size, rank score or a differential thereof. The graphical user interface 102 may be provided on a touch-sensitive display to enable user interaction with the content items. The list of content item 111-120 may all be concurrently displayed, or a subset 116, 117, 118 are displayed as the content list is navigated. The presentation of the content items 116, 117, 118 may be presented in a uniform or evenly spaced format with regular or varying size, presented based upon display dimension or content dimension, or a characteristic of the content item used to determine the size.

The property common to the content items 111-120 may be presented against a navigation list 160, for example a timeline, range, distance measure, scoring scale, a ranking list or order associated with the common property of the content items 111-120. The navigation list 160 provides indicia 170, which may be provided by navigation element, enabling the content items to be navigated relative to the common property. The common property may also be associated with each content item 111-120 to present a measure to define how the content items are distributed within the list by modification of the indicia 170. The navigation list 160 may also be used to navigate through the content items, relative to the subset of content items that are displayed, where the movement of the indicia 170, or navigation element, relative to the navigation list 160 results in movement of the content items 111-120 within the graphical user interface 102 and vice versa.

Figure 2:
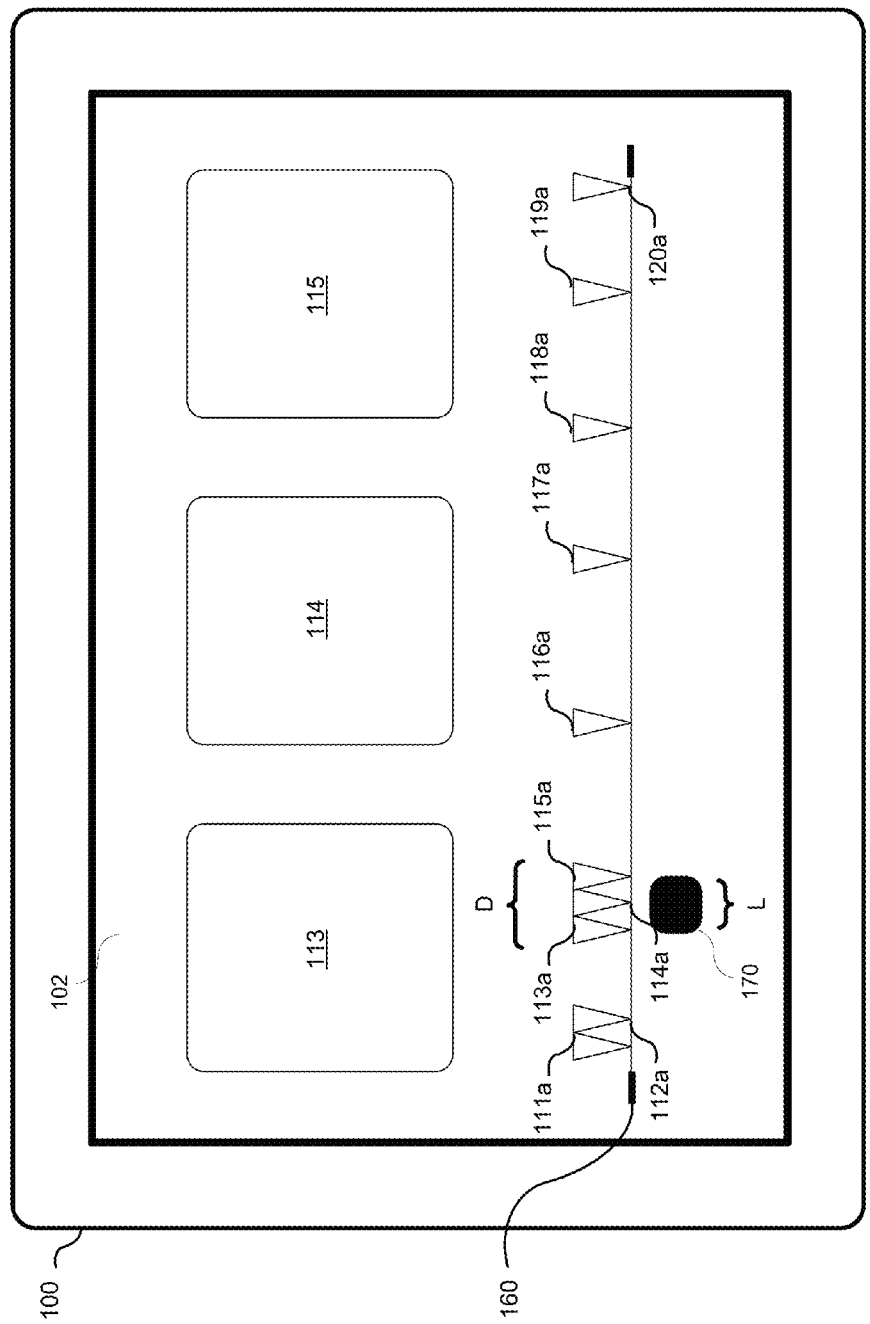
Figure 3:
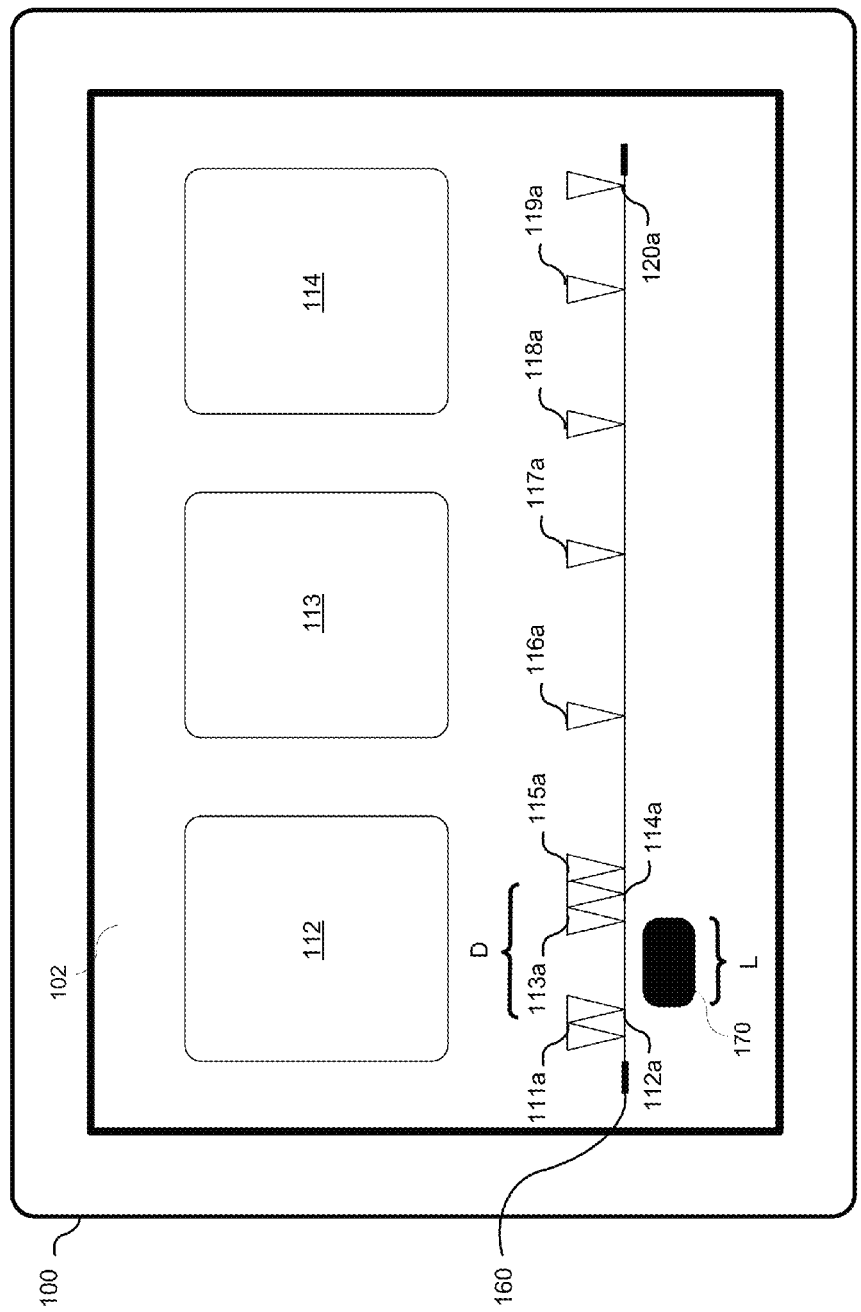

The property associated with the content items may be utilized to modify a display element of the indicia 170, for example the length (L), to represent a measure of the property of the content items displayed 116, 117, 118. For example if the property is time, the distance (D) between the displayed indicia 116a-118a can be used to modify of the appearance of the indicia 170 to increase the length (L) of the indicia 170 to represent a measure of the distance relative to the common property of the content items 116, 117, 118. As shown in FIG. 2 when the displayed content items 113, 114, 115 are closer together based upon the determined property as defined in distance (D), the size of the display element, in this example length (L) of the indicia, is reduced relative to a measure of the associated properties 113a, 114a, 115a of content items 113, 114, 115. The modification of the display element provides a measure and a sense of scale relative to the currently displayed content items 113, 114, 115 in relation to the content list. As shown in FIG. 3, the displayed content items 112, 113, 114 and associated property 112a, 113a, 114a have a larger distance (D) compared to the content items 113, 114, 115 and associated property 113a, 114, 115a, the length (L) of the display element of the indicia 170 will therefore be modified to increase in the length in proportion to the measure of the displayed content items. The indicia 170 is modified based on the measure of the property associated with the displayed content items or the position of the indicia relative to the content items. Although the example presented shows a subset of the content items, the display may present all of the content items, where the navigation list 160 provide a dynamic measure of the relative properties of content items.

Figure 4:
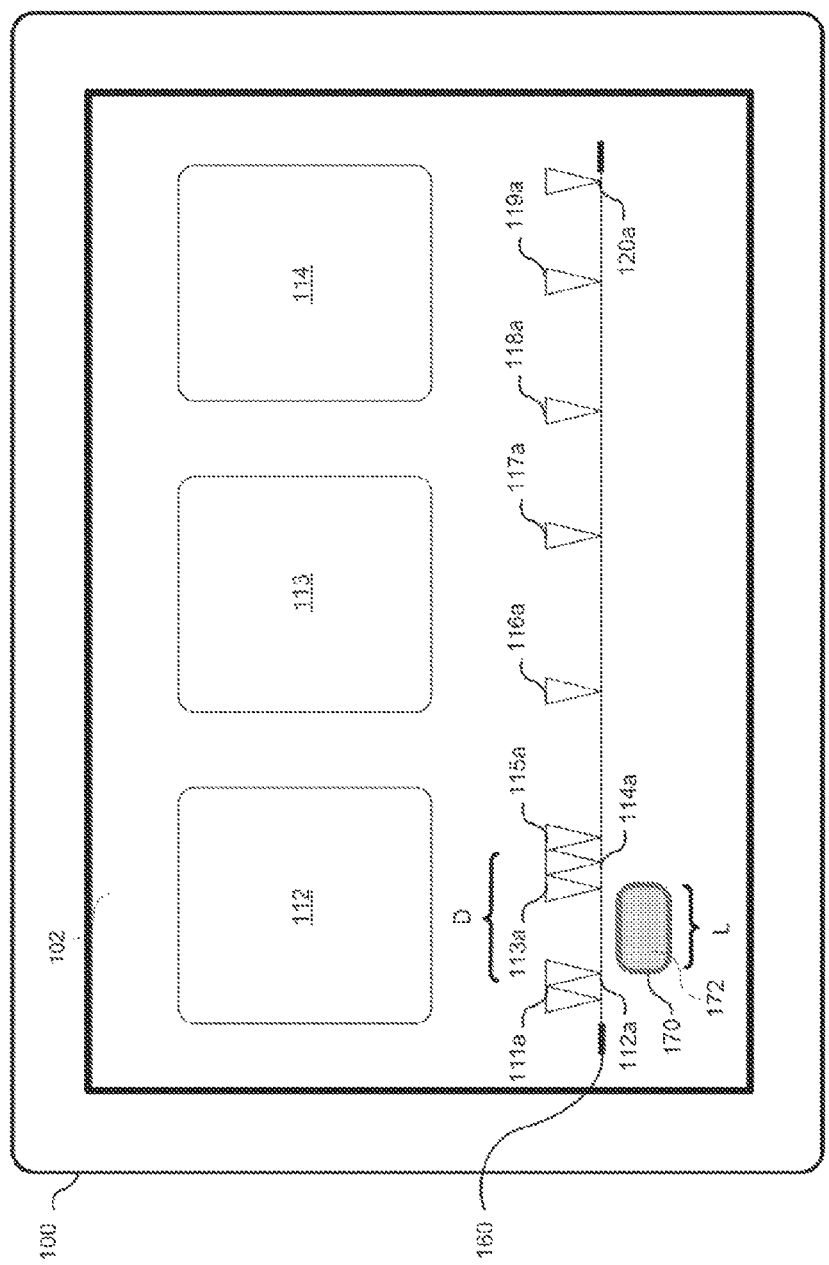

As shown in FIG. 4, an additional display element of the indicia 172 may also be modified based upon another measure of the property associated with the content item. For example, in addition to varying the display element by length (L) of the indicia 170 based upon the currently displayed content items, 112, 113, 114, the display element may be additionally modified by another visual property, for example, by color, to present additional information visually. The additional modification of the additional display element may be use to represent additional information that can be derived from the content items, a relationship between items, or parameters associated with one or more properties of the content items represented by the indicia. Alternatively, the additional display element may be modified independently of the primary property measure or modified in combination with one or more additional properties of the content items. The additional display element may be used to modify the display element to provide an additional visual representation of the content items properties or characteristics, for example the type of content items displayed, proximity to other items, the number of items, a distance or measure. For example if the content items in the list is ordered by date, and the length of the display element is modified in relation to the number of days associated with the content items displayed, the additional information may identify the number of days defined in the range and or change in color in relation to the number of days to present additional modification to the display element.

Figure 5:
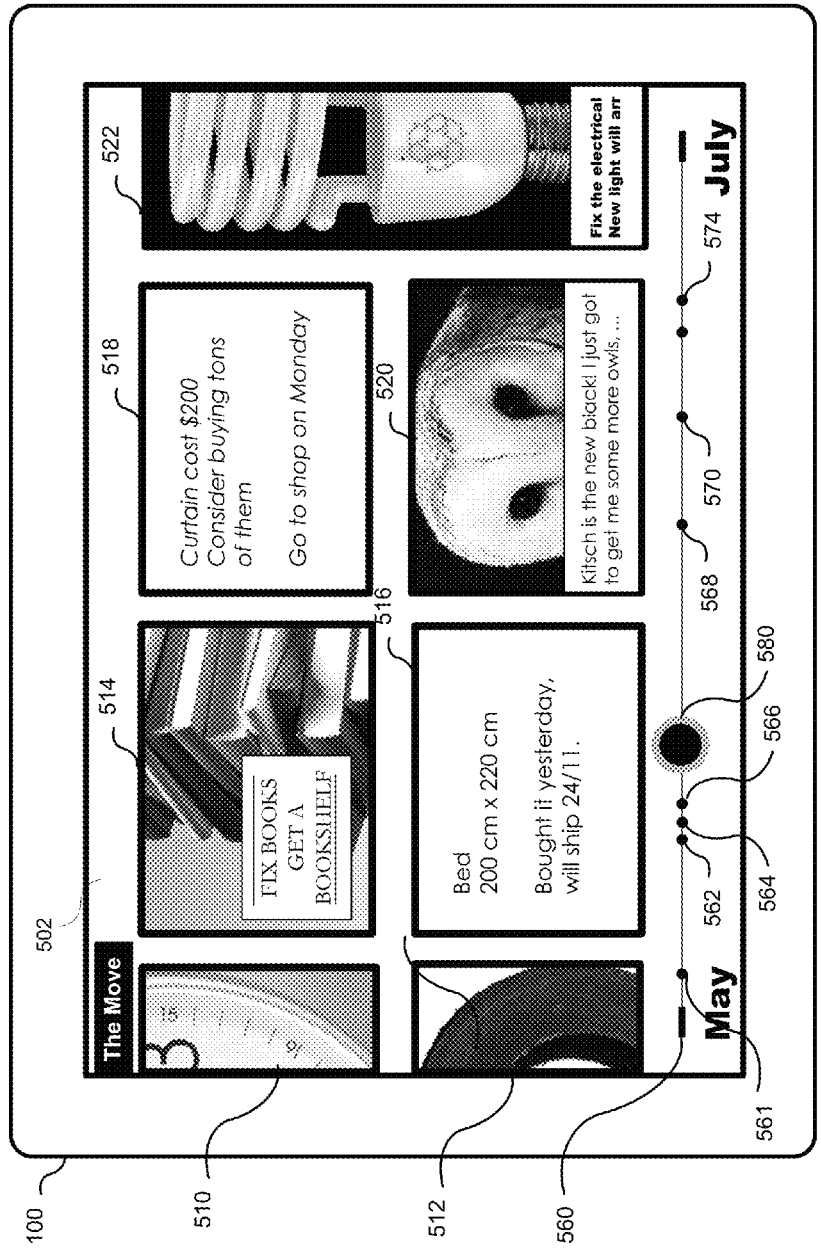
FIGS. 5 & 6 show representations of a graphical user interface displaying a content item list and an associated list of characteristics for navigation.

FIG. 5 shows a representation of a graphical user interface providing a content item list and an associated navigation list displaying the order of the content items in a list sorted by a property referred to as characteristic of each content item. An electronic device 100 provides a display for providing a graphical user interface 502 for displaying in a graphical format the list of the content items. The graphical user interface displays sorted content items 510, 512, 514, 516, 518, 520, 522, from the content list in segmented blocks on the display but is presented in a relatively uniform graphical format. The displayed content items represent only a subset of the total content items in the content list and present a smaller time span with to the navigation list. The segmented blocks may be images, text, video, or a combination therein generated from a source of content items having a common characteristics, such as a timestamp, by which they can be ordered or sorted. In this example content items 510 to 522 are notes and images sorted to be presented in a chronological order, based on a common characteristic such as a creation or a due date timestamp, from the oldest on the left of the display to the most recent on the right side of the display. The density of the graphical representation of the displayed content items 510 to 522 in the content item list can be relatively constant, although there may be some variability within the graphical presentation. The content items 510 to 522 can be identified on the navigation list 560, shown as a timeline, based upon their associated sort characteristic by visual identifiers, 566 to 568, and are a subset of the complete content list defined by identifier 561 to 574. It should be noted that the identifier associated with the characteristic may not necessarily be shown in the navigation list. Each identifier 561 to 574 is associated with one or more content items defined by their associated characteristic of the complete content item list, for example content items 510 and 512 could be associated with identifier 566, and content items 514 to 522 with identifier 564, etc. In this example the movement of the indicia, referred to as a navigation element 580 along the navigation list 560, by for example a touch gesture, would move the content items across to display the content item associated with the position along the navigation list 560 in a sliding fashion, however the speed of movement of the content items 510 to 522 may vary based upon the position of the navigation element 580 within the navigation list 560. Alternatively, the navigation element 580 may be moved as the content item 510 to 522 are swiped across the screen resulting in the navigation element 580 to move along the navigation list 560 with varying speeds. In areas along the navigation list where content items characteristic, such as the timestamp, are disbursed unevenly and the navigation element 580 is moved along the navigation list by a touch input associated with the display, the content items 510 to 522 would not necessarily move consistently as the navigation element 580. Similarly the speed of movement of the navigation element 580 varies as the content items 510 to 522 are swiped or moved across screen to account for the gaps in the navigation list 560. In this example along the length, or span, of the navigation list 560, the size of the navigation element 580 remains the same and only reflects a position along the navigation list and not the span of time defined by the content items displayed.

Figure 6:
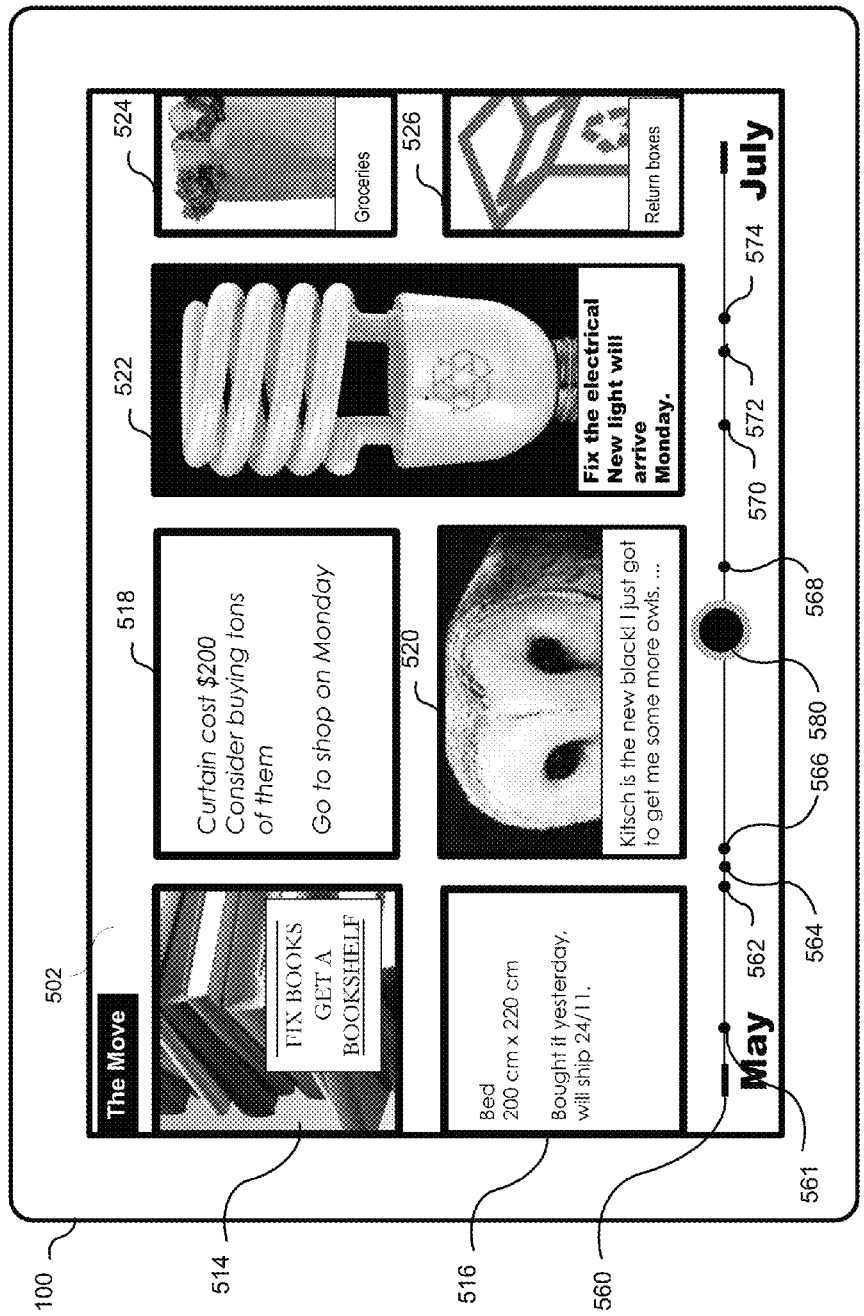

As shown in FIG. 6, the position of the navigation element 580 changes as the displayed content items from the content item list changes. When the navigation element 580 moves along the navigation list closer to the characteristic associated with identifier 568, the content items that are displayed may change, as the displayed time span changes, for example content items 524 and 526 associated with identifier 572 are displayed. The currently displayed content items from the content item list present a subset of the complete content items list 510 to 526, where the display content items are a sliding time window of the content items relative to the navigation list 560. In this example the content items 510 and 512 are removed from the display and new content items 524 and 526 from the content list are displayed as the navigation element 580 is moved along the navigation list 560. If the motion of the navigation element 580 remains constant as it moves along the navigation list, the movement of the content items 510 to 526 does not remain constant, as the content items are only placed in view as the navigation list progresses through movement of the navigation element 580 through the navigation list 560, timeline. In addition the navigation element does not provide a sense of the time span of content displayed relative to the navigation list as the navigation element only defines a position within the navigation list.

Figure 7:
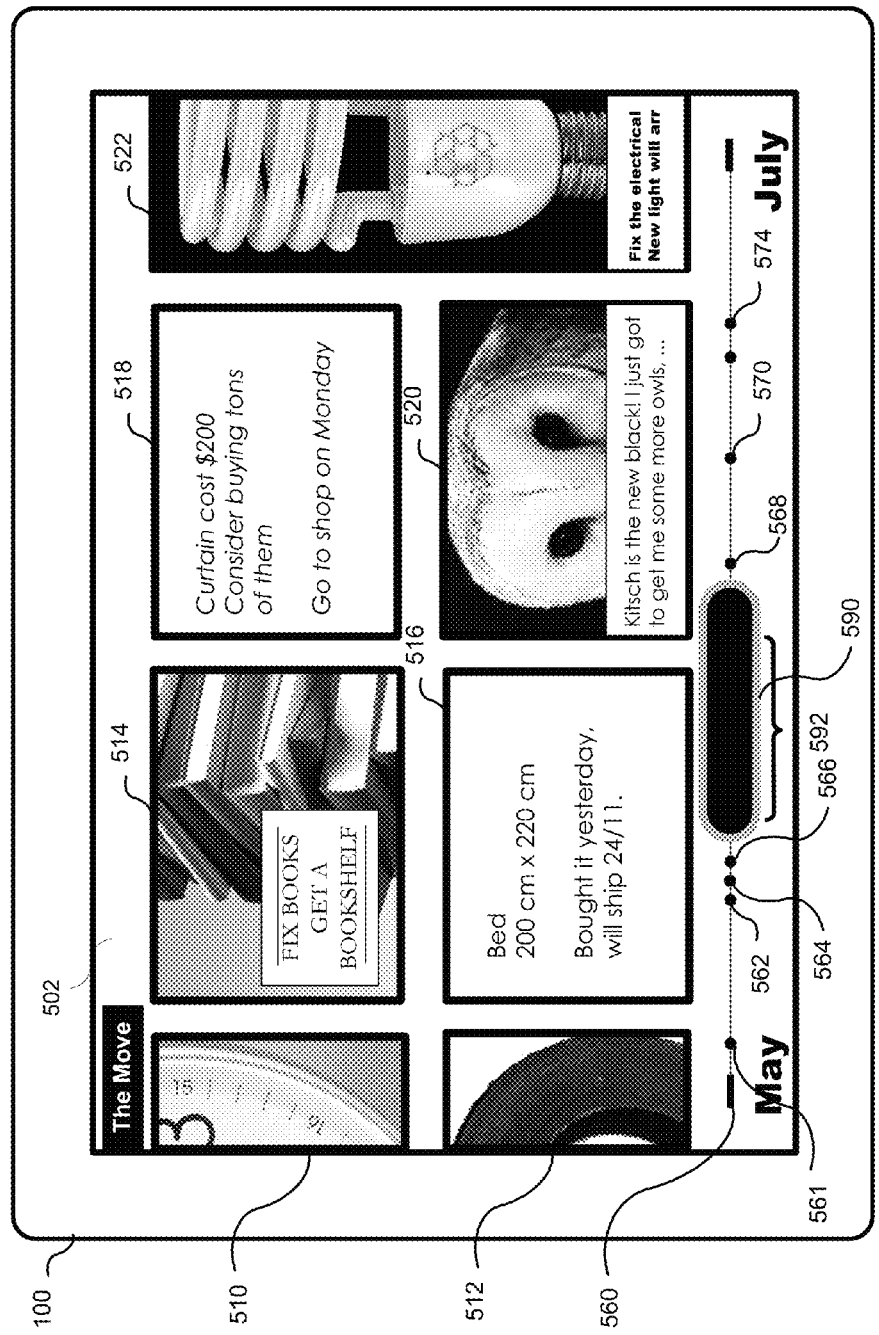
FIGS. 7 & 8 show representations of a graphical user interface displaying a content item list with an associated list of characteristics for navigation having a scalable navigation element.

FIG. 7 shows a representation of a graphical user interface providing a content item list with a navigation list having a navigation element. The navigation element 590 display element is defined by a width 592 which is modified based upon a measure between content items 510 and 522, which in this example is a time span, within the navigation list 560. The time span is defined by the characteristics associated with the displayed content items 510 and 522 between identifiers 566 to 568 defined for the property of the content items relative along the length of the navigation list 560. For example the navigation element 590, shown as a scroll bar handle, can dynamically scale in width 592 relative to the distance between characteristics of content item characteristics, for example the first displayed content item 510 and last displayed content item 522 which may be associated with characteristics defined by identifiers 566 and 568 respectively. The navigation element 590 is modified 592 to show the measure of the displayed content items 510 to 522 in proportion to the length of the full content item list. For example the identifiers 561 to 574 may define 60 days and represent 30 content items total, where the characteristics of identifiers 566 and 568 for content items 510 and 522 define a period of 32 days for 7 content items, having a relatively low density of content items relative to the full navigation list. The determination of the content items that define the time span may be associated with the first displayed content item 510 and the last displayed content item 522. The definition of what constitutes the first and last displayed content item may be defined by the particular graphical representation of the content items. For example, if an image is associated with the content item a certain percentage may be required to be displayed in order for the associated characteristic to define the measure for scaling of the navigation element 590 is determined.

Figure 8:
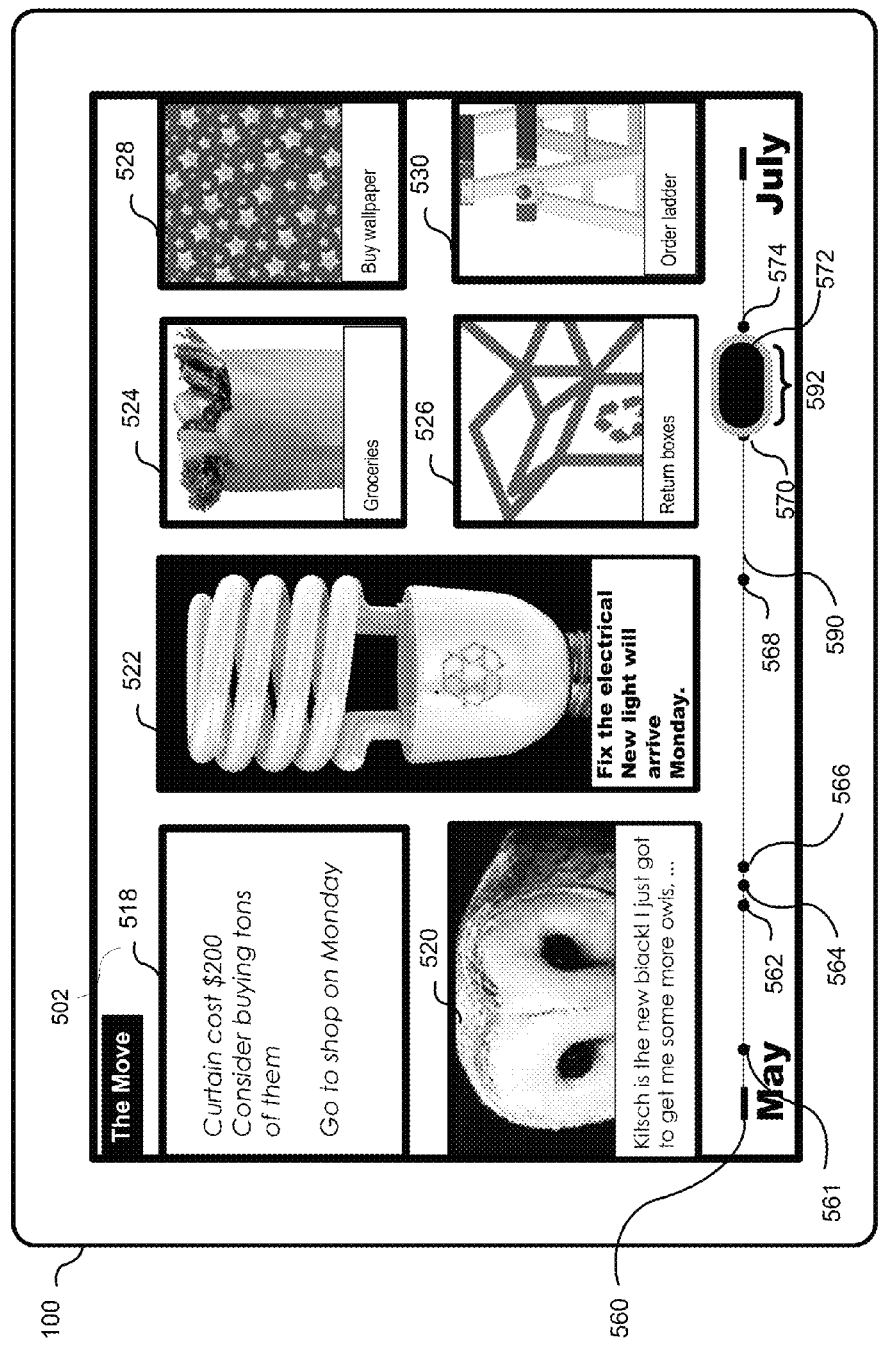

In FIG. 8 the navigation element 590 width 592 can be modified when characteristics of displayed content items are closer together within the navigation list. The closer the characteristics of the displayed content items are identified in the navigation list 560, the width 592 of the navigation element 590 is reduced relative to the displayed time span defined by the content items 518 to 530 the associated characteristics identified 570 to 574 in the navigation list. For example content items 518 to 530 may define a span of 10 days, and present 7 content items. The movement of the navigation element 590 will result in a more consistent movement of the content items 518 to 530 as the content item list is navigated relative to the navigation list and more accurately identify the time span currently being displayed relative to the overall navigation list.

Although the navigation list has been described as a time-based property associated with the content items, the property may be any common characteristics that may be sorted alphabetically or numerically. For example a contact name or address in contact list, by phone numbers in phonebook, location identifiers, or a value of a parameter that can be defined as a property of the content items. Content items can be defined by a measure relative to a value of the common property, such as a number associated with a date, chronologically or numerically, or the measure between characteristics may be defined relative to a measure relative to the cardinality of the set by which the common property is defined, such as in an alphabetical list. For example an alphabetical list may not have content items for all 26 letters, but the navigation list would be defined relative to all 26 letters being used to determine the measure of the characteristics.

In addition, as shown in the attached images, the navigation list is positioned below the content items but they may be placed in any number of orientations relative to the content items being displayed. For example a vertical orientation on the graphical user interface or an opposing orientation to the movement of the content items may be provided, such as vertical left and right movement along the navigation list or timeline may move the content item horizontally up and down. The navigation list may also be integrated with the presentation of the content items. The display element of the navigation element may also be modified in appearance, such as by color, texture or shape based upon the distances between the associated identifiers and provide additional visual information regarding the distance between characteristics. It is assumed that the content item list may be navigated by a swipe gesture of the graphical representation of the content items, or by movement of the navigation element along the navigation list, with the navigation element scaling relative to the associated characteristics of the content items along the navigation list to maintain a consistent speed of the navigation element along the navigation list relative to the movement of the content items and vice versa.

Figure 9:
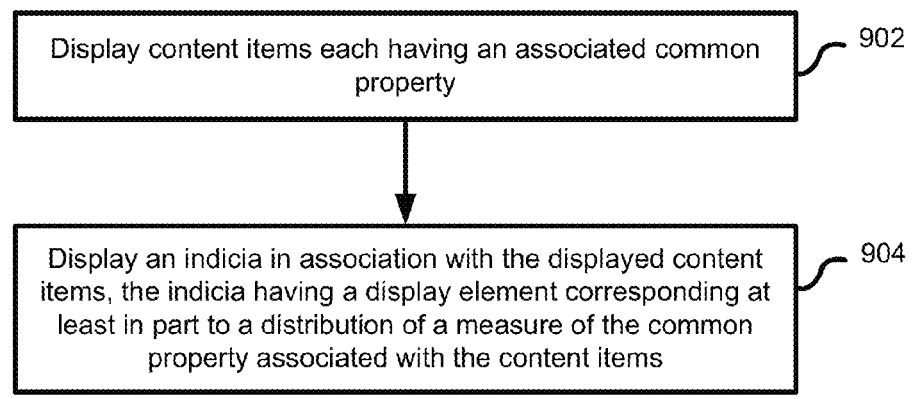
FIG. 9 shows a method of displaying content items.

FIG. 9 is a method 900 of a method of displaying content items. Content items each having an associated common property (902) is displayed in a graphical user interface of an electronic device. The content items can be displayed in a graphical representation of the content items, icon or representative graphic, or by providing the content item itself, image or text. The content items can be provided in an ordered or structured in a list format. An indicia, such as a navigation element, is displayed in association with the displayed content items. The indicia has a display element that corresponds at least in part to a distribution of a measure of the common property associated with the content items. The display element may be the length of the indicia, color, shape, height width, transparency, or any appearance aspect that may be varied. The indicia property can be defined by a characteristic common to the content items such as time, date, distance, size, rank, score or differential thereof and is modified based on the common property of the displayed content items. The contents items may only display a portion or subset of the content items provided in the content list and as the indicia is moved relative to the common property, the display of the subset of content items is controlled when the indicia provides a navigation element capability. The navigation element in association with the indicia provides an indication of the relative position of the content items relative to the associated common property and a measure between the content items. The content items that are displayed graphically are determined based upon the position of the indicia with respect to the navigation element, for example representing a position within the content item list. The indicia may also have additional display elements corresponding at least in part to a distribution of additional measures where the display element is modified to represent the additional measures. The additional measures may be a measure of another common property associated with each of the content items and may be derived at least in part from the measure of the common property of the content items.

Figure 10:
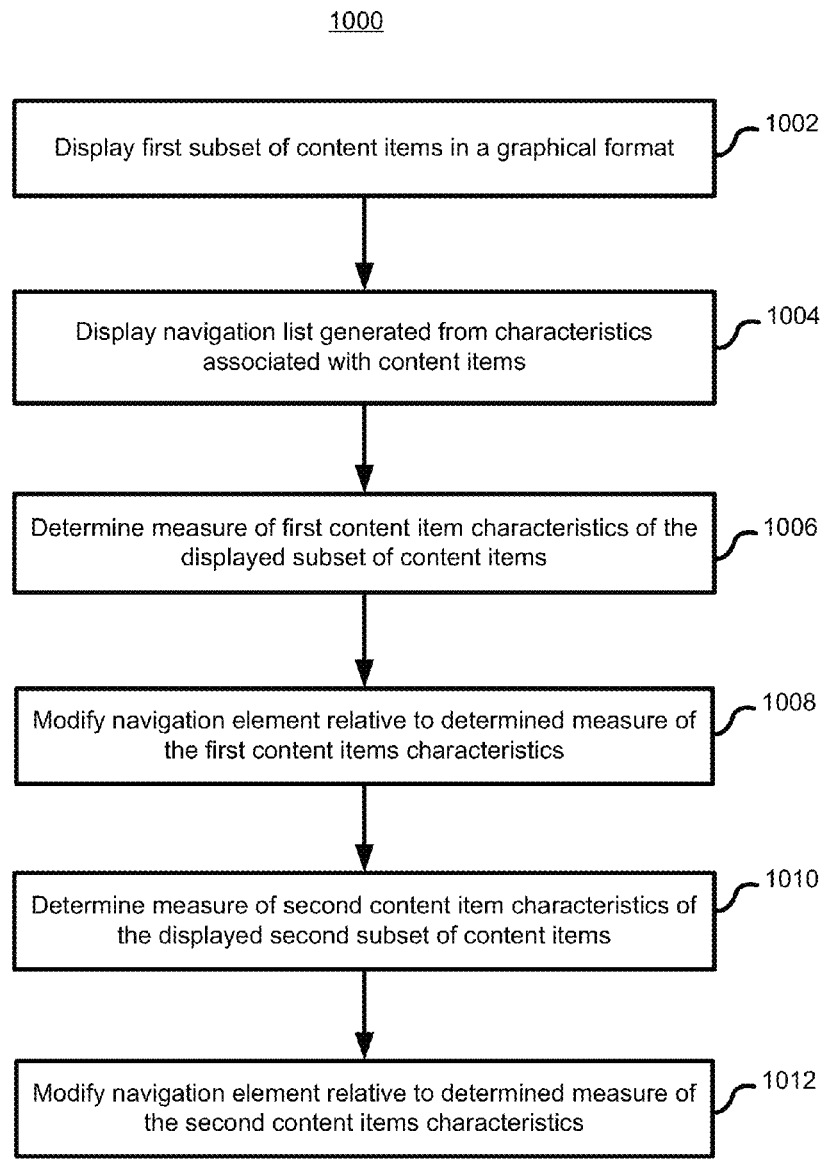
FIG. 10 shows a method of displaying and navigating a content item list.

FIG. 10 is a method 1000 of navigating a content item list in a graphical user interface. Content items that can be defined in a content item list that can be ordered or sorted based upon a property present or associated with each content item. In this example the content items can be navigated in a graphical user interface by the use of a navigation element on a navigation list associated with the content items. A first subset of the content items from the list is displayed (1002) in a graphical representation providing in a uniform density of content items sorted associated with the property. The initial selection of the subset of content items can be based upon a default selection or an initial user selection when initiating the graphical user interface. The size and shape of how the graphical representation of the content items may vary however they will be displayed within defined constraints to provide relative uniform display appearance and content density. The navigation list is displayed (1004) relative to or defined by the property associated with content items, and is navigated by a navigation element positioned within the navigation list. For example the navigation list may define a range of 2 months where the associated property of each content item is the date when a content item was created. A measure of a first displayed content items in the navigation list, such as the first and last of the displayed content items of the first subset of content items is determined (1006). The determined measure can define a range or period between characteristics such as a distance value determined relative to the characteristics, chronological or numerical, or a relative distance within an order defined by the characteristics, chronological or alphabetical. The navigation element is then modified relative to determined measure of the first displayed content items characteristics in relation to navigation list (1008). The length or size of the navigation list may be defined by the measure or distance between the characteristic of the first content item and the characteristics of the last content item in the content list or by a fixed or defined measure, such as monthly increments, presented by the navigation list, that is the measure of the navigation list may be larger than the range defined by actual content items that constitute the content item list. When the subset of displayed content items changes, a second characteristics associated with the displayed content items within the navigation list is determined relative to the displayed subset of content items (1010). The navigation element is then modified relative to the determined measure between the second content items characteristics. The navigation element therefore is modified dynamically as it moves along, or through, the navigation list based upon the distance between the displayed content items to provide an indication of the measure defined by the displayed characteristics. The movement of the navigation element will therefore coincide with the movement of the navigation element and vice versa in a uniform manner and provide a better sense of the range represented by the displayed content items within the navigation list.

Figure 11:
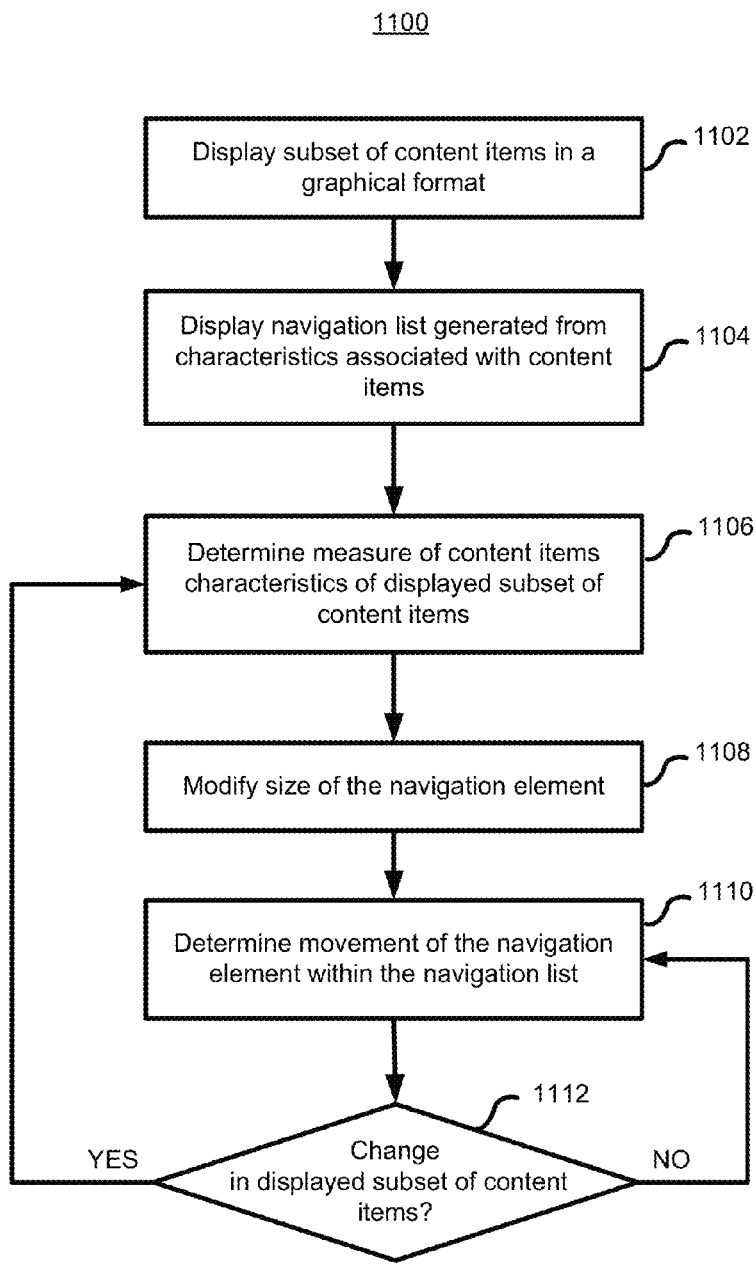
FIG. 11 shows an alternative method of displaying and navigating a content item list.

FIG. 11 is an alternative method 1100 of navigating a content item list in a graphical user interface. A subset of the content items from the list is displayed (1102) in a graphical representation providing in a uniform density of items sorted associated with the property defined by a common characteristic of the content items. The selection of the initial subset of content items can be based upon a default selection or an initial user selection when initiating the graphical user interface. The size and shape of how the graphical representation of the content items may vary however they will be displayed within defined constraints to provide uniform display appearance and content density. A navigation list is displayed defined from the characteristics that the content item list (1104) to enable navigation through the content item list. A navigation element is provided, such as a scroll bar, to show the relative position of the displayed subset of content items within the navigation list. The characteristics associated with the content items may be displayed or bookmarked along the navigation list, although it is not required. In the navigation list, the measure of a content item characteristics from the displayed subset of content items is determined (1106) which may be defined by a distance or length there between. The measure may be defined by the characteristics of the first and last content items of the subset of content items that are displayed which may be defined relative to how the content items are presented graphically. For example a certain amount of the content item may be required to be displayed to be considered part of the content item characteristics. The navigation element is modified relative to the determined measure and the total length or size of the content item list (1108). The modification may comprise proportionally increasing or decreasing the width of the navigation element, such as a scrollbar handle relative to the axis of the navigation list. The further apart displayed characteristics are relative to the navigation list measure, the larger the navigation element is scaled, the closer the characteristics are relative to the defined characteristic, such as time, the smaller the navigation element is scaled. Additional measures of the characteristic or other characteristics may be utilized to modify additional aspects of the display element of the navigation object. A change in the displayed subset of the content items is determined by movement of the navigation element or through direct movement the content items (1110) through user interaction with the graphical user interface. When a new set of content items are displayed (YES at 1112) the measure of the displayed characteristics is re-determined (1106) and the navigation element is modified proportionally. If the movement of the navigation element and the associated content items does not result in a change in the display of the subset of characteristics (NO at 1112), the scaling of the navigation element remains the same (1110) until further movement is determined (1110). The display element of the navigation element is thus dynamically adjusted based upon the measure between characteristics of the subset of displayed content items within the content item list providing the user with a better sense of the measure defined by the displayed content items with in the navigation list relative to the total content item list.

Figure 12:
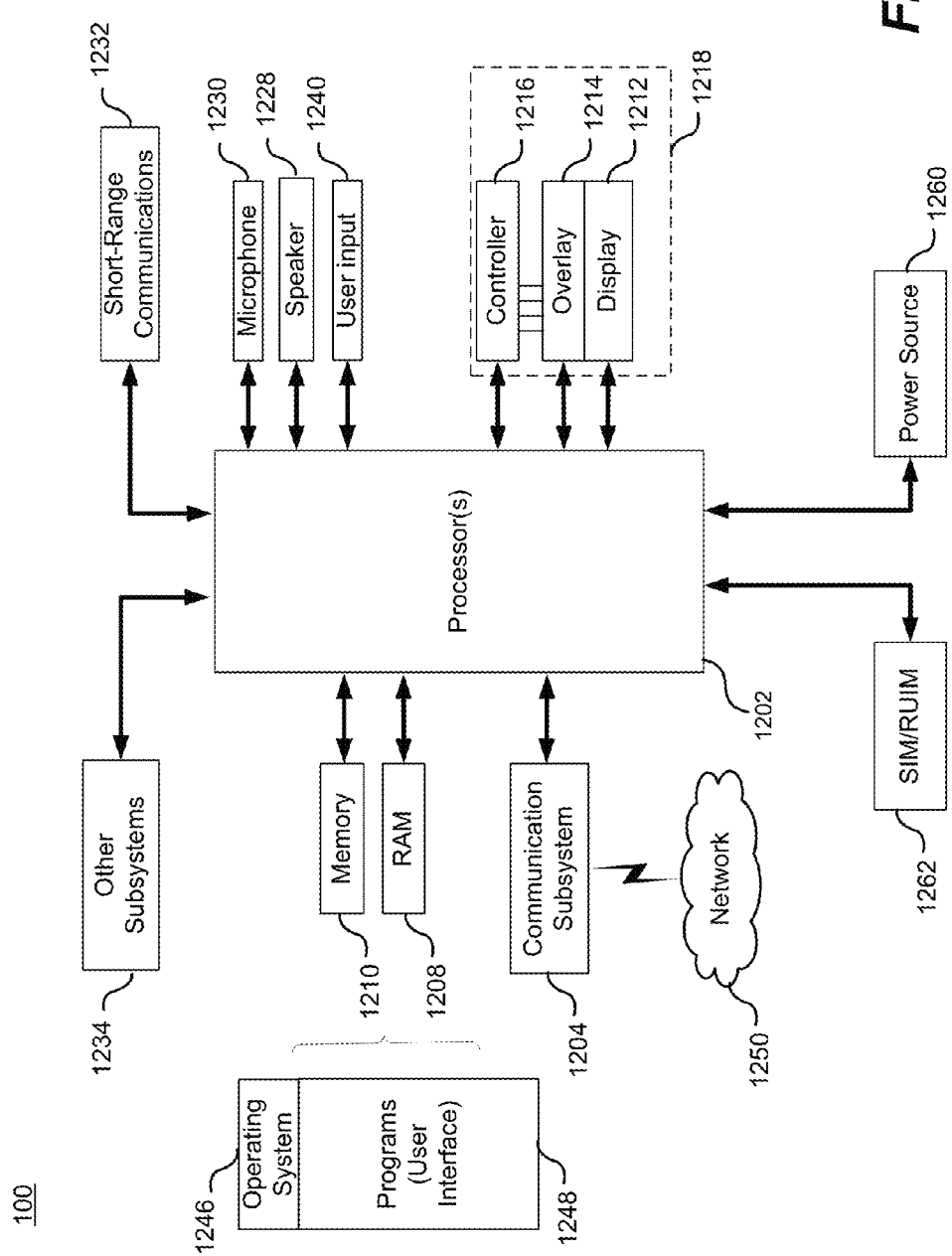
FIG. 12 shows schematic representation of a device for executing a graphical user interface for displaying and navigating content items.

FIG. 12 is a schematic depiction of an example electronic device for displaying a content item list. As shown by way of example in FIG. 12, the electronic device 100, includes a processor (or microprocessor) 1202 for executing one or more applications, memory in the form of flash memory 1210 and RAM 1208 (or any equivalent memory devices) for storing an operating system 1246 and one or more applications 1248 providing the graphical user interface with which the user interacts with the device. The processor receives power from a power supply 1260, which may be a direct connection or provided by a battery source.

As shown by way of example in FIG. 12, the electronic device 100 may include a communication subsystem 1204 which provides radiofrequency (RF) transceiver to communicate through a wireless network 1250. The electronic device 100 may be in a portable form factor such as a smart phone, tablet, net book, laptop, portable computing device or an integrated mobile computer device. The electronic device 100 that may access wired or wireless networks to retrieve content items. The RF transceiver for communication with a wireless network 1250 using a wireless communication protocols such as, for example but not limited to, GSM, UMTS, LTE, HSPDA, CDMA, W-CDMA, Wi-MAX, Wi-Fi etc. A subscriber identify module (SIM) card 1262 may be provided depending on the access technology supported by the device. The communication subsystem 1204 may also provide wired communication through a network.

Optionally, where the device is a voice-enabled communications device such as, for example, a tablet, smart-phone or cell phone, the device would further include a microphone 1230 and a speaker 1228. Short-range communications 1232 is provided through wireless technologies such as Bluetooth™ or wired Universal Serial Bus™ connections to other peripheries or computing devices or by other device subsystems 1234 which may enable access tethering using communications functions of another mobile device. In a tethering configuration the electronic device 100 may provide the network information associated with the tethered or master device to be used to access the network. The device 100 may optionally include a Global Positioning System (GPS) receiver chipset or other location-determining subsystem.

The operating system 1246 and the software components that are executed by the microprocessor 1202 are typically stored in a persistent store such as the flash memory 1210, which may alternatively be a read-only memory (ROM) or similar storage element (not shown). Those skilled in the art will appreciate those portions of the operating system 1246 and the software components, such as specific device applications, or parts thereof, may be temporarily loaded into a volatile store such as the RAM 1208. Other software components can also be included, as is well known to those skilled in the art. The content items may be displayed as part of the graphical user interface where the content items are stored local or accessible via a network or a combination therein. The graphical user interface may provide display for only a particular content item type or may combine multiple content item types as long as there is a consistent characteristics such as a timestamp for which the content items can be sorted along the navigation list. User input 1240 may be provided by integrated input devices such as a keyboard, touchpad, touch screen, mouse, camera or positing apparatus to actuate transitions. The electronic device 100 may have an integrated touch-sensitive display 1218 having a display screen 1212, with a touch-sensitive overlay 1214 coupled to a controller 1216 for enabling interaction with the electronic device 100. The display portion of the electronic device 100 may not necessarily be integrated but may be coupled to the electronic device 100.

Although certain methods, apparatus, computer readable memory, and articles of manufacture have been described herein, the scope of coverage of this disclosure is not limited thereto. To the contrary, this disclosure covers all methods, apparatus, computer readable memory, and articles of manufacture fairly falling within the scope of the appended claims either literally or under the doctrine of equivalents.

Although the following discloses example methods, system and apparatus including, among other components, software executed on hardware, it should be noted that such methods, system and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods, system and apparatus.

The invention claimed is:

1. A method on an electronic device, the method comprising:
    displaying content items each having an associated common property in a graphical user interface on a display of the electronic device;
    displaying an indicia in association with the displayed content items, the indicia for identifying a position of the displayed content items relative to the associated common property by which the content items are ordered for display within the graphical user interface;
    determining a measure of the common property associated with the displayed content items; and
    automatically modifying, by the electronic device, a display element of the indicia corresponding at least in part to a distribution of the measure of the common property associated with the displayed content items, the modifying the display element of the indicia in response to change in the measure of the common property based upon positions of each of the content items displayed within the graphical user interface.

2. The method of claim 1 wherein the common property is presented by a navigation list, and wherein a range of the common property shown by the navigation list is larger than the range defined by the content items.

3. The method of claim 1 wherein the common property associated with time, date, distance, size, rank, score or differential thereof.

4. The method of claim 1 wherein the display element is defined by a length, color, transparency, height or width of the indicia.

5. The method of claim 1 wherein displayed content items are a subset of a plurality of content items.

6. The method of claim 5 wherein the display element is based upon the distribution of the subset of content items.

7. The method of claim 6 wherein the indicia can be moved relative to the common property to control the display of the subset of content items on the display of the electronic device.

8. The method of claim 1 further comprising displaying a navigation element in association with the indicia, the navigation element providing an indication of the relative position of the content items relative to each of the associated common properties of the content items, where movement of the navigation element moves the displayed content items.

9. The method of claim 8 wherein a position of the indicia with respect to the navigation element providing an indication of the relative positions of the displayed content items in relation to the position of all content items.

10. The method of claim 9 wherein the content items that are displayed graphically are determined based upon the position of the indicia with respect to the navigation element.

11. The method of claim 1 wherein the indicia having a second display element corresponding at least in part to a distribution of a second measure.

12. The method of claim 11 wherein the second measure is a second common property associated with each of the content items.

13. The method of claim 11 wherein the second measure being derived at least in part from the measure of the common property of the content items.

14. The method of claim 1 wherein the common property is defined as a time associated with each content item, the indicia identifying a position of the displayed content items along a timeline of all the content items, the display element changing in length along the timeline based upon the measure of time between content items relative to a displayed subset of content items, wherein movement of the content items within the user interface changes the position of the indicia along the timeline and movement of the indicia along the timeline changes the position of the displayed content items where only a subset of content items are displayed at any time.

15. An electronic device for navigating a plurality of content items in a graphical user interface, the electronic device comprising:
   a touch-sensitive display for presenting the graphical user interface;
   a processor coupled to the touch-sensitive display; and
   a memory containing instructions for execution by the processor, the instructions for
      displaying content items each having an associated common property in the graphical user interface on the display of the electronic device;
      displaying an indicia in association with the displayed content items, the indicia for identifying a position of the displayed content items relative to the associated common property by which the content items are ordered for display within the graphical user interface;
      determining a measure of the common property associated with the displayed content items; and
      automatically modifying, by the electronic device, a display element of the indicia corresponding at least in part to the distribution of a measure of the common property associated with the displayed content items, the modifying the display element of the indicia in response to change in the measure of the common property based upon positions of each of the content items displayed within the graphical user interface.

16. The electronic device of claim 15 wherein displayed content items are a subset of a plurality of content items.

17. The electronic device of claim 16 wherein the display element is based upon the distribution of the subset of content items.

18. The electronic device of claim 16 wherein the indicia can be moved relative to the common property to control the display of the subset of content items on the display of the electronic device.

19. The electronic device of claim 15 further comprising displaying a navigation element in association with the indicia, the navigation element providing an indication of the relative position of the content items relative to each of the associated common properties of the content items, where movement of the navigation element moves the displayed content items.

20. The electronic device of claim 19 wherein a position of the indicia with respect to the navigation element providing an indication of the relative positions of the displayed content items in relation to the position of all content items.

21. The electronic device of claim 19 wherein the content items that are displayed graphically are determined based upon the position of the indicia with respect to the navigation element.

22. The electronic device of claim 15 wherein the indicia having a second display element corresponding at least in part to a distribution of a second measure.

23. The electronic device of claim 22 wherein the second measure is a second common property associated with each of the content items.

24. The electronic device of claim 23 wherein the second measure being derived at least in part from the measure of the common property of the content items.

25. The electronic device of claim 15 wherein the display element is defined by a length, color, transparency, height or width of the indicia.

26. The electronic device of claim 15 wherein the common property is presented by a navigation list, and wherein a range of the common property shown by the navigation list is larger than the range defined by the content items.

27. The electronic device of claim 15 wherein the common property is defined as a time associated with each content item, the indicia identifying a position of the displayed content items along a timeline of all the content items, the display element changing in length along the timeline based upon the measure of time between content items relative to a displayed subset of content items, wherein movement of the content items within the user interface changes the position of the indicia along the timeline and movement of the indicia along the timeline changes the position of the displayed content items where only a subset of content items are displayed at any time.

28. The electronic device of claim 15 wherein the common property associated with time, date, distance, size, rank, score or differential thereof.

29. A non-transitory computer readable memory containing instructions for navigating a plurality of content item in a graphical user interface of an electronic device, the instructions when executed by a processor perform:
   displaying content items each having an associated common property in the graphical user interface on a display of the electronic device;
   displaying an indicia in association with the displayed content items, the indicia for identifying a position of the displayed content items relative to the associated common property by which the content items are ordered for display within the graphical user interface;
   determining a measure of the common property associated with the displayed content items; and automatically modifying, by the electronic device, a display element of the indicia corresponding at least in part to a distribution of the measure of the common property associated with the displayed content items, the modifying the display element of the indicia in response to change in the measure of the common property based upon positions of each of the content items displayed within the graphical user interface.

\* \* \* \* \*